United States Patent
Yang et al.

(10) Patent No.: US 8,190,628 B1
(45) Date of Patent: May 29, 2012

(54) PHRASE GENERATION

(75) Inventors: Stewart Yang, Sunnyvale, CA (US);
Fang Liu, Beijing (CN); Dekang Lin, Cupertino, CA (US); Hongjun Zhu, Los Altos, CA (US)

(73) Assignee: Google Inc., Mountain View, CA (US)

( * ) Notice: Subject to any disclaimer, the term of this patent is extended or adjusted under 35 U.S.C. 154(b) by 983 days.

(21) Appl. No.: 11/948,917

(22) Filed: Nov. 30, 2007

(51) Int. Cl.
*G06F 7/00* (2006.01)
*G06F 17/30* (2006.01)

(52) U.S. Cl. ............... 707/767; 707/736; 704/10
(58) Field of Classification Search ............ 707/767, 707/736; 704/10
See application file for complete search history.

(56) References Cited

U.S. PATENT DOCUMENTS

| | | | |
|---|---|---|---|
| 6,671,681 B1 * | 12/2003 | Emens et al. | 707/706 |
| 7,051,023 B2 * | 5/2006 | Kapur et al. | 707/690 |
| 7,620,539 B2 * | 11/2009 | Gaussier et al. | 704/2 |
| 7,668,791 B2 * | 2/2010 | Azzam et al. | 706/45 |
| 7,685,197 B2 * | 3/2010 | Fain et al. | 707/732 |
| 7,822,763 B2 * | 10/2010 | Sauls et al. | 707/766 |
| 7,844,589 B2 * | 11/2010 | Wang et al. | 707/706 |
| 7,844,599 B2 * | 11/2010 | Kasperski et al. | 707/713 |
| 7,877,258 B1 * | 1/2011 | Chelba et al. | 704/257 |
| 7,937,265 B1 | 5/2011 | Pasca et al. | |
| 2002/0128821 A1 * | 9/2002 | Ehsani et al. | 704/10 |
| 2005/0071152 A1 * | 3/2005 | Morimoto et al. | 704/10 |
| 2006/0074634 A1 * | 4/2006 | Gao et al. | 704/9 |
| 2008/0027888 A1 * | 1/2008 | Azzam et al. | 706/45 |
| 2008/0091413 A1 * | 4/2008 | El-Shishiny et al. | 704/10 |
| 2008/0172378 A1 * | 7/2008 | Dolan | 707/5 |
| 2010/0306229 A1 * | 12/2010 | Timm et al. | 707/767 |

* cited by examiner

*Primary Examiner* — Angela M Lie
*Assistant Examiner* — Mark Lee
(74) *Attorney, Agent, or Firm* — Fish & Richardson P.C.

(57) ABSTRACT

Aspects directed to phrase generation are provided. A method is provided that includes identifying a plurality of phrase candidates from a plurality of text string entries in a corpus. For each phrase candidate: identifying a plurality of left contexts and a plurality of right contexts for the phrase candidate, each left context of the plurality of left contexts being a nearest unique feature to the right of the phrase candidate in a text string entry and each right context of the plurality of right contexts being the nearest unique feature to the right of the phrase candidate, and calculating a left context vector including a score for each left context feature and a right context vector including a score for each right context feature of the phrase candidate. A similarity is determined between pairs of phrase candidates using the respective left and right context vectors for each phrase candidate.

22 Claims, 7 Drawing Sheets

PHRASE GENERATION

BACKGROUND

The present disclosure relates to phrase generation.

A phrase is a group of one or more consecutive words (e.g., an n-gram) that carries a concrete and complete meaning and can function as a single syntactic unit in a sentence. An n-gram has an order according to the number of words in the n-gram, (e.g., a unigram, bi-gram, tri-gram, etc.). For example, a unigram phrase is a one word phrase, e.g., "Chicago" or "book". A bi-gram phrase is a two word phrase, e.g., "New York" or "computer science". Some phrases could be long, e.g., "President of the United States of America". Phrases can be extracted from text strings having one or more words. For example, a sentence or other text string can include one or more phrases. Furthermore, a non-phrase (or a bad phrase) is a group of one or more consecutive words that is not a phrase.

Phrase extraction is typically used in natural language processing applications. For example, in a web search application, a list of commonly used phrases can be used to improve the precision of returned results, reduce latency in presenting results, and provide phrases for query expansion. However, identifying quality phrases can be difficult. For example, conventional phrase generation techniques are language dependent, for example, relying on a grammatical relationship between a given phrase candidate and other words to identify particular phrases.

SUMMARY

In general, in one aspect, a method is provided. The method includes identifying a plurality of phrase candidates from a plurality of text string entries in a corpus. For each phrase candidate of the plurality of phrase candidates: identifying a plurality of left contexts and a plurality of right contexts for the phrase candidate, each left context of the plurality of left contexts being a nearest unique feature to the right of the phrase candidate in a text string entry and each right context of the plurality of right contexts being the nearest unique feature to the right of the phrase candidate, and calculating a left context vector including a score for each left context feature and a right context vector including a score for each right context feature of the phrase candidate. The method also includes determining a similarity between pairs of phrase candidates using the respective left and right context vectors for each phrase candidate of the pair. Other embodiments of the aspect include systems, apparatus, and computer program products.

Implementations of the aspect can include one or more of the following features. The features can be identified from a frequency count of n-grams occurring in a feature corpus. The aspect can further include clustering similar phrase candidates. The aspect can further include identifying common features from each phrase candidate in the respective cluster, filtering the phrase candidates removing non-common features, and determining a refined similarity between pairs of phrase candidates using the filtered features for each phrase candidate. The phrase candidates can be derived from filtered search queries or web documents. The search queries can be filtered to remove non-phrases.

The score for each feature can be a mutual information score representing a relationship strength between the feature and the particular phrase candidate. Identifying good phrases can include identifying seed good phrases and determining phrase candidates similar to seed good phrases as good phrases. The seed good phrases can be identified from a randomly selected collection of seed good phrases. The similarity between pair of phrase candidates can include comparing a vector distance between left and right context vectors of each phrase candidate of the pair.

Particular embodiments of the invention can be implemented to realize one or more of the following advantages. A context based similarity is used to identify similar phrase candidates. The context based similarity is language independent, which allows phrases to be generated for multiple languages with low overhead. Features used to calculate similarities between candidate phrases are filtered to significantly improve resulting similarities. A small seed collection of manually generated good phrases can be used to rapidly generate a much larger large collection of good phrases. Given a phrase, all its semantically similar phrases can be found for example, using entries in a similarity table. The initial seed collection can be generated in an arbitrary fashion. For example, the initial seed collection can be randomly selected and still converge to a collection of high quality good phrases collection. In some implementations, bad phrase can be identified in a similar manner as good phrases using a seed collection of manually generated bad phrases. The identification of bad phrases can be done in conjunction with the identification of good phrases, such that the two processes check and balance each other. The resulting bad phrase collection can then be used to identify and remove bad phrases from a larger collection of candidate phrases The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
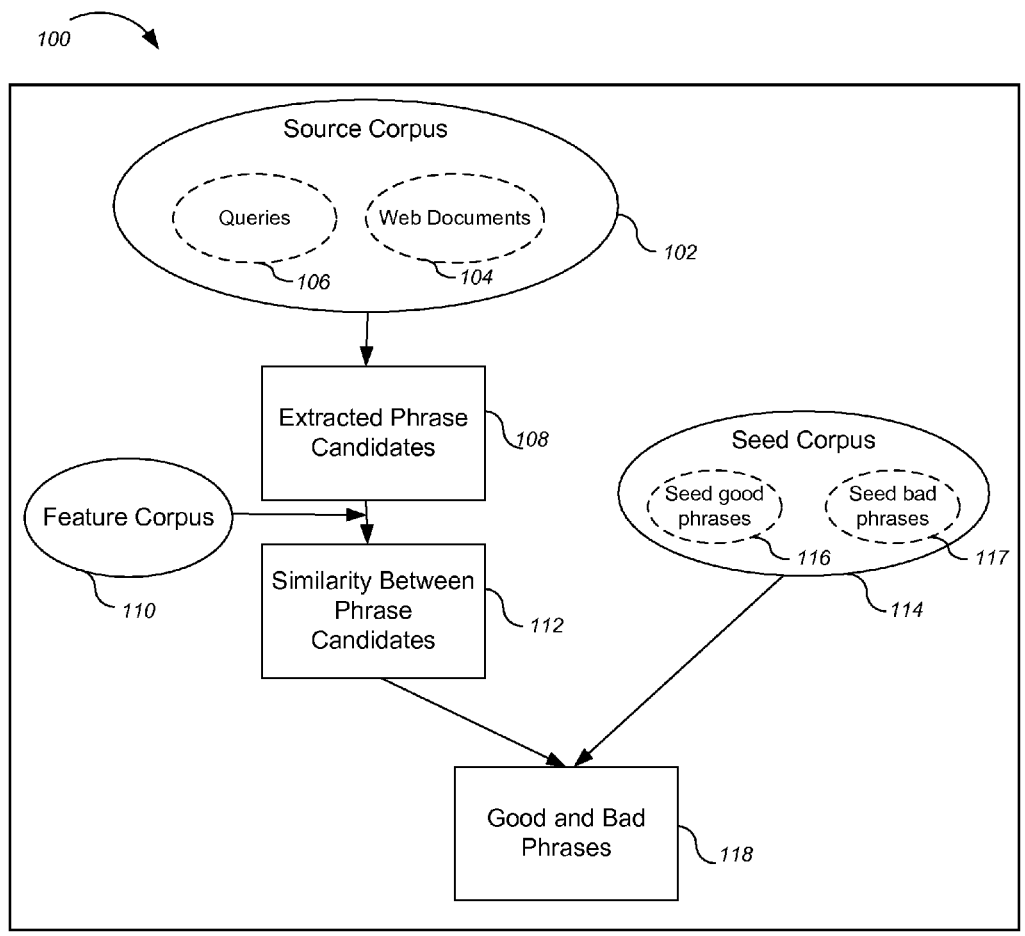
FIG. 1 is a block diagram illustrating a phrase generation system.

FIG. 1 is a block diagram illustrating a phrase generation system 100. The system 100 includes a source corpus 102 containing potential phrase candidates. The source corpus 102 can be generated using one or multiple distinct information sources. For example, the source corpus 102 can include text from a collection of web documents 104 or from a log of input search queries 106. In some implementations, the source corpus 102 is generated using source data compiled over a specified period of time (e.g., a week of user queries) or from a random sampling of data (e.g., a representative collection of web documents). In some implementations, the source corpus is language dependent such that phrases can be generated for a particular language of the corpus.

The phrase generation system uses the text entries in the source corpus 102 to identify extracted phrase candidates 108. The extracted phrase candidates 108 include a collection of individual phrase candidates extracted from the source corpus 102. For example, the extracted phrase candidates 108 can include phrase candidates extracted from sentences of web documents 104. The extracted phrase candidates 108 are analyzed with respect to a collection of features in a feature corpus 110 in order to compute a similarity between phrase candidates 112. The similarity between phrase candidates 112 identifies context similarity between any two phrase candidates.

A seed corpus 114 provides seed good phrases 116 and seed bad phrases 117. The seed corpus 114 can be manually generated, e.g., by one or more individuals. In some implementations, the seed corpus 114 includes only a few hundred seed good phrases 116. The seed good phrases 116 can be used with the similarity between phrase candidates 112 to identify good phrases and bad phrases 118. The good phrases 118 can then be used, for example, in one or more natural langue processing applications.

Figure 2:
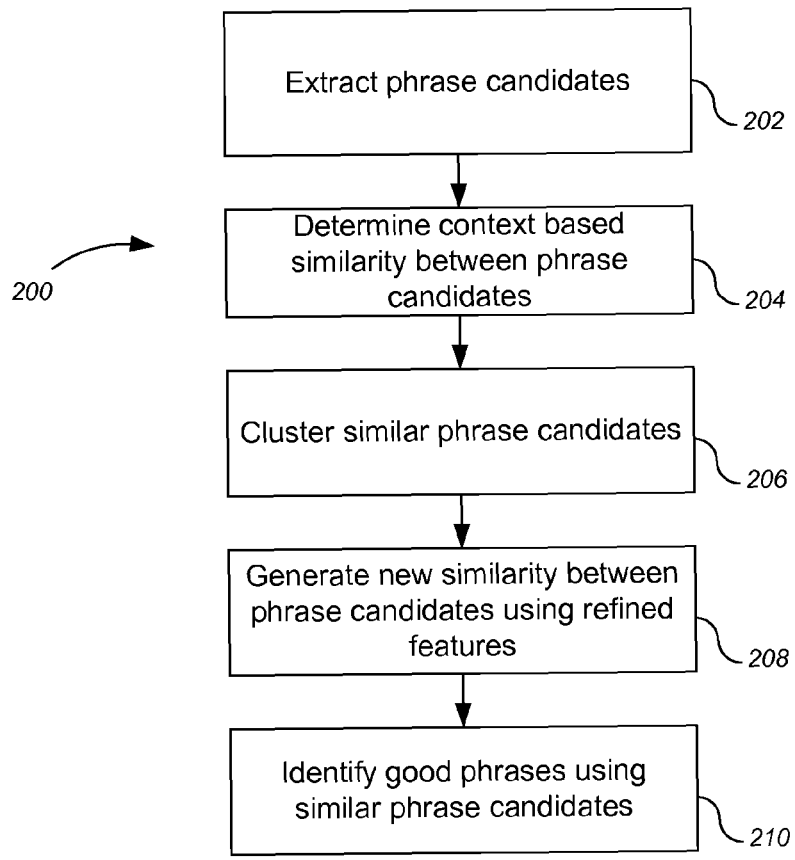
FIG. 2 is a flowchart of an example method for phrase generation.

FIG. 2 is a flowchart of an example method 200 for phrase generation. For convenience, the method 200 will be described with respect to a system that performs the method 200. The system extracts 202 phrase candidates. The phrase candidates can be extracted from a corpus of text information (e.g., source corpus 102 of FIG. 1). The corpus can include, for example, entries corresponding to query logs and sentences from web documents. Each phrase candidate can be an n-gram extracted from the corpus. For example, phrase candidates can be extracted from text strings in the corpus including sentences of web documents and web queries.

In some implementations, phrase candidates are filtered to remove URL's, IP addresses, dates, symbols, and other non-phrases, e.g., advanced search operators. Additionally, long phrases can be removed or alternatively not included in the phrase candidate extraction (e.g., n-grams of order 10 or higher).

Figure 3:
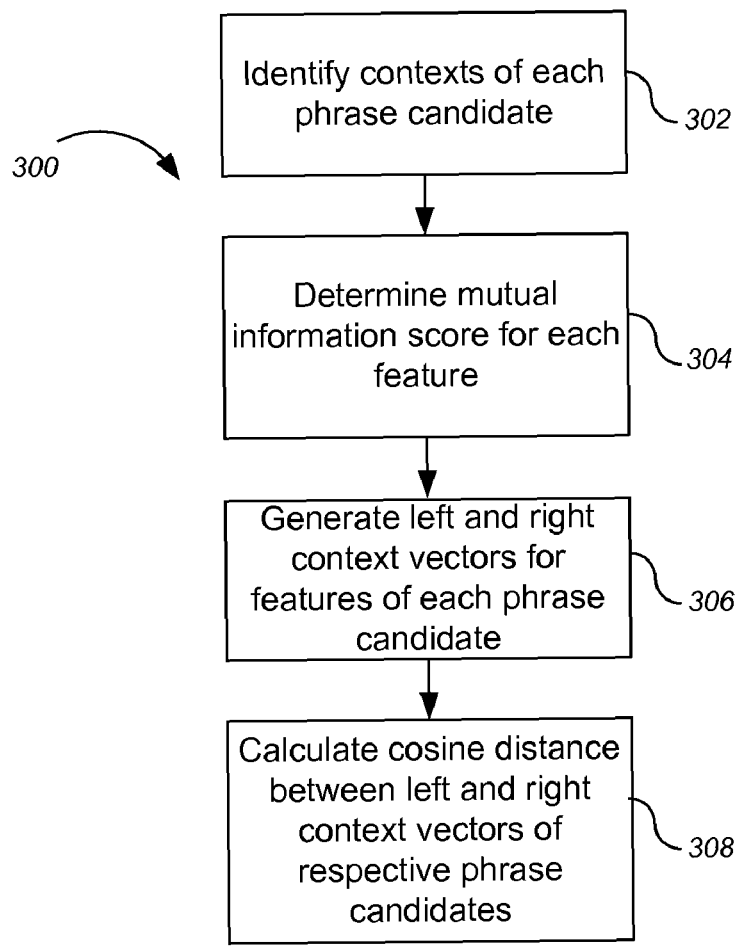
FIG. 3 is a flowchart of an example method for determining similarity between phrase candidates.

The system determines 204 a context based similarity between phrase candidates. FIG. 3 is a flowchart of an example method 300 for determining similarity between phrase candidates. For convenience, the method 300 will be described with respect to a system that performs the method 300. The system identifies 302 a context for each phrase candidate. The context of a phrase candidate includes both a left context and a right context. The left context corresponds to features occurring immediately to the left of the phrase candidate in the corpus. The right context corresponds to features occurring immediately to the right of the phrase candidate in the corpus. For example, the corpus can include a number of unique sentences that include a particular phrase candidate but with each having a different context. Similarly, a number of sentences in the corpus can include the same context for a given phrase candidate.

Features are a collection of high count n-grams derived from a feature corpus. The feature corpus can be the same corpus or a different corpus from the corpus used to extract phrase candidates. For example, n-gram counts can be calculated for a feature corpus of web documents and search queries. A collection of the highest count n-grams can be identified as features.

For example, in some implementations, the system identifies the top 300,000 most frequently occurring n-grams in the feature corpus as features. In some implementations, stop words are filtered out. Stop words are words that appear with the highest frequency in a large corpus of text but carry little or no meaning, for example, "is", "a", "the". In some implementations, the features include an identification of the beginning or end of a sentence. Thus, a phrase candidate can occur at the beginning or end of a corpus entry (e.g., a sentence from a web document) where the left context is the sentence beginning or the right context is the sentence end, respectively.

For example, for the phrase candidate "stock exchange" in the corpus entry "New York stock exchange will close on Memorial Day" the left context of the string is "New York" and the right context is "close". In the example sentence, the word "will" is not a feature, but instead is a stop word. Consequently, the nearest feature to the right of "stock exchange" is "close".

A given phrase candidate occurring in multiple entries in the corpus can have a number of different left and right contexts. For example, other left contexts to the phrase candidate "stock exchange" can include "micex", "the paris", "euronext", "oslo", "rts", and "helsinki" Other right contexts to the phrase candidate "stock exchange" can include "composite index", "kosdaq", "market value", and "flotation".

The system calculates 304 a score for each feature identified as a context for the phrase candidate. For example, a mutual information score can be calculated to provide a measure of the relationship strength between the feature and the phrase candidate. In some implementations, the mutual information score is calculated as a function of the frequency that the feature occurs together with the phrase candidate and the frequencies that the phrase candidate and feature occur individually in the corpus. In particular, the mutual information score of a feature in the left context can be written as:

$$M = \log\left(\frac{\# \text{ (left context phrase candidate)}}{(\# \text{ left context})(\# \text{ phrase candidate})}\right).$$

Thus, the mutual information score for the feature "New York" as the left context of the phrase candidate "stock exchange" is:

$$M = \log\left(\frac{\# \text{ New York stock exchange}}{(\# \text{ New York})(\# \text{ stock exchange})}\right).$$

where # New York stock exchange is the frequency that "New York stock exchange" occurs in the corpus, # New York is the frequency that "New York" occurs in the corpus, and # stock exchange is the frequency that "stock exchange" occurs in the corpus.

In some implementations, the system uses an intervening stop word in the mutual information score. For example, in the above example sentence, the stop word "will" is between the phrase candidate "stock exchange" and the right context feature "close". The system can apply a portion of the mutual information score to the stop word and a portion of the mutual information score to the feature (e.g., half to each). Thus, the strength of a particular relationship between a phrase candidate and a feature can be influenced by the presence of intervening stop words.

The system generates 306 left and right context vectors for the identified features of each phrase candidate. The left context vector includes mutual information scores for features occurring as the left context of the particular phrase candidate. Similarly, the right context vector includes mutual information scores for features occurring as the right context of the particular phrase candidate. Thus, each phrase candidate has two associated context vectors. Each context vector can include mutual information scores for a large number of features. For example, in some implementations, each vector includes up to 2000 features. Using the above example, the left context vector for the phrase candidate "stock exchange" is:
<[micex] 6.962552, [the paris] 7.432347, [euronext] 8.339796, [oslo] 7.3914142, [rts] 7.782584, [Helsinki] 7.877495, . . . >
Similarly, the right context vector for the phrase candidate "stock exchange" is: <[composite index] 8.145269, [kosdaq] 5.9232, [market value] 8.23242, [flotation] 4.52342, . . . >

The system calculates 308 a cosine distance between the left and right context vectors of each pair of phrase candidates to determine a similarity between the pair. For example, when determining the similarity between the phrase candidate "stock exchange" and the phrase candidate "bourse" the cosine distance is calculated for the left and right context vector pairs of the phrase candidates. For example, if the left context vector of "bourse" is:
<[micex] 6.23432, [the paris] 6.3894, [hira] 8.343812, [oslo] 5.9492, [Warsaw] 7.5322, [Helsinki] 6,77495 . . . > and the right context vector is: <[euronext] 9.3242, [kosdaq] 7.02324, [market value] 4.323498, [tumbled] 5.83242 . . . > then the cosine distance can be calculated for the left and right context vector pairs.

The cosine distance represents the angular distance between two vectors. For example, for two vectors <a, b, c> and <x, y, z>, the cosine distance is provided by:

$$\cos dist(\langle a, b, c\rangle, \langle x, y, z\rangle) = 1 - \frac{ax + by + cz}{\sqrt{a^2 + b^2 + c^2} \sqrt{x^2 + y^2 + z^2}}.$$

The higher the cosine distance (range from 0 to 1) the greater the similarity between the two vectors. For example, the cosine distance for the two left context vectors of "stock exchange" and "bourse" is 0.3146 and the cosine distance between the two right context vectors is 0.2031.

In some implementations, when determining the similarity between a pair of phrase candidates, the lower of the two cosine distance values is used, e.g., 0.2031. In other implementations, the two values can be averaged or otherwise manipulated to determine a similarity value.

In some alternative implementations, a different measure of similarity between phrase candidates can be calculated. For example, other techniques for calculating a distance between vectors can be used, e.g., a BrayCurtis distance measure.

As shown in FIG. 2, the system clusters 206 similar phrase candidates. The phrase candidate clusters can be generated according to a clustering algorithm. For example, a clustering algorithm such as k-medoids clustering identifies a number of cluster medoid values (e.g., particular phrase candidates chosen as the center point of the cluster). In some implementations, the medoids are selected at random (e.g., 10,000 randomly selected phrase candidates). Members of each cluster (i.e., member phrase candidates) are assigned according to the distance between the phrase candidate and one or more medoid values. A measure of the overall distance of members of the cluster relative to the medoid can be calculated. In some implementations, the medoids are changed to correspond with other phrase candidates and the clusters are recalculated based on the new medoid values. This can change the membership of a given cluster if the medoid of one cluster moves relative to the medoid of another cluster. A specified number of iterations generating clusters using different medoids can be performed to generate clusters having the smallest distance between members. Alternatively, iterations can be performed until some event occurs (e.g., until the cluster medoid results in a threshold distance between members).

Other clustering techniques can be used, for example, k-means clustering. In some alternative implementations, the system uses calculated cosine distance values to cluster similar phrase candidates. For example, a cluster can include as members phrase candidates having a threshold cosine distance from each other phrase candidate in the cluster. In some implementations, each phrase candidate can be a member of more than one cluster.

Figure 4:
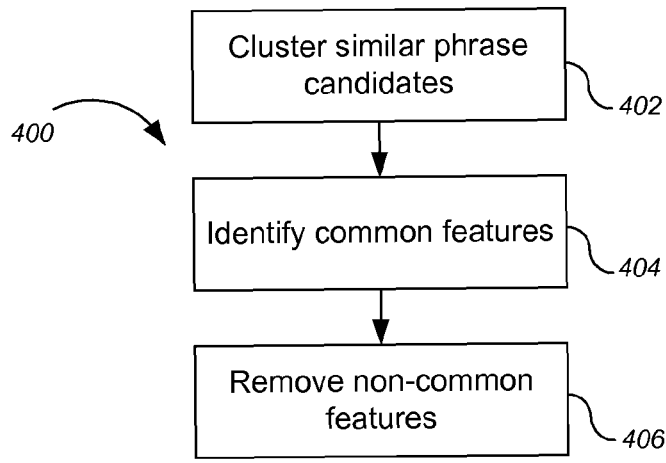
FIG. 4 is a flowchart of an example method 400 for using the clustering information to refine the similarity between phrase candidates

FIG. 4 is a flowchart of an example method 400 for using the clustering information to refine the similarity between phrase candidates. The method 400 will be described with respect to a system that performs the method 400. The system clusters 402 similar phrase candidates. The phrase candidates can be clustered, for example, based on one or more clustering algorithms, as described above.

Figure 5:
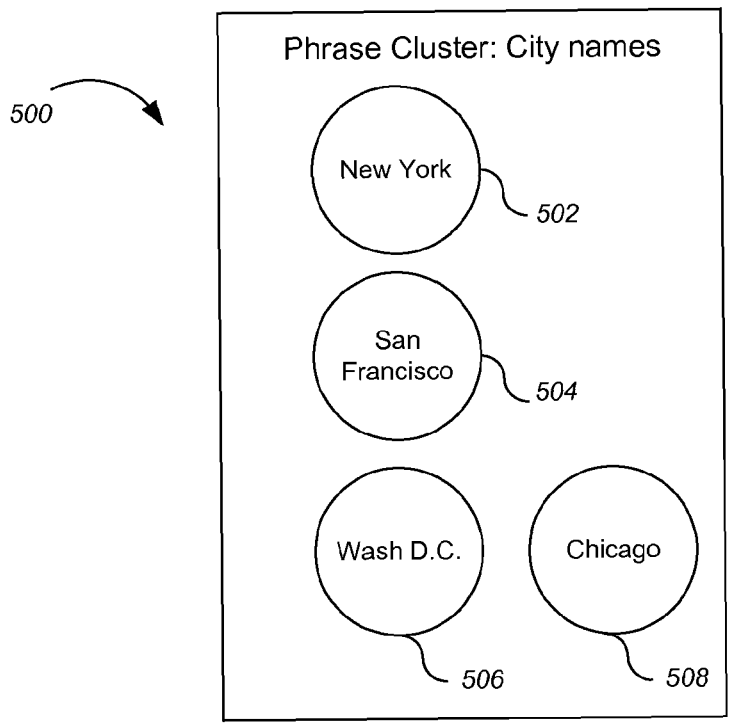
FIG. 5 is a block diagram showing an example phrase cluster.

FIG. 5 is a block diagram showing an example phrase cluster 500. The phrase cluster 500 can include phrase candidates, for example, that identify different cities. For example, the phrase cluster 500 can include phrase candidates New York 502, San Francisco 504, Washington D.C. 506, and Chicago 508. Each phrase candidate in the cluster 500 has a threshold similarity to other phrase candidates in the cluster 500, e.g., based on the cosine distance calculated between member phrase candidates of the cluster.

As shown in FIG. 4, the system identifies 404 common features for phrase candidates in each cluster. Common features between phrase candidates in the cluster provide a stronger indication of similarity between the phrase candidates. However, common features can be overshadowed by features having particularly strong relationships to specific phrase candidates (e.g., because of a high mutual information score for that particular feature). For example, considering the city name cluster of FIG. 5, common features of city name phrases can include "restaurant" and "hotel", which can be found as features in the context of multiple phrase candidates of the cluster. However, other features can have a very high mutual information score but be specific to a single phrase candidate. For example, the feature "WABC", identifying a particular New York radio station, can have a high mutual information score indicating a strong relationship of the feature to the phrase candidate New York, but little or no relation to other phrase candidates in the cluster.

The non-common features weaken the similarity between phrase candidates (e.g., the cosine distance is lower than it would be without the non-common feature). For example, New York would have a higher similarity to Chicago if New York was not associated with the non-common feature "WABC". Similarly, "Tribune" can be a non-common feature that has a strong relationship with the phrase candidate Chicago. These strong non-common features can skew the cosine difference between the two phrase candidates even if they share common features, e.g., "hotel" and "restaurant".

The system filters clusters to remove 406 non-common features from phrase candidates in each cluster. In some implementations, only non-common features having higher mutual information scores than common features are removed. Removing non-common features can increase the similarity between phrase candidates (e.g., increased cosine distance between the phrase candidates) by emphasizing the strength of common features and remove noisy similarity between phrase candidates caused by an overlap in uncommon-features.

As shown in FIG. 2, the system generates 208 a new similarity between phrase candidates using the refined features for the phrase candidates identified using the cluster information. The similarity can be calculated using the cosine distance for context vectors as described above, where the vectors have been filtered to remove the non-common features.

The system identifies 210 good phrases using similar phrase candidates. Good phrases are those phrase candidates that are similar to other good phrases based on an initial collection of seed good phrases. The seed good phrases are those phrases which have been selected to be good phrases. For example, phrases formed from n-grams that represent a concrete and complete meaning. These can include names (e.g., people, titles, products, etc.). Additionally, commonly used n-grams can also be identified as good phrases. However, the particular identification of a good phrase can vary depending on the application. Regardless, the collection of seed good phases can be used to identify a large collection of good phrases according to their similarity to other good phrases.

Figure 6:
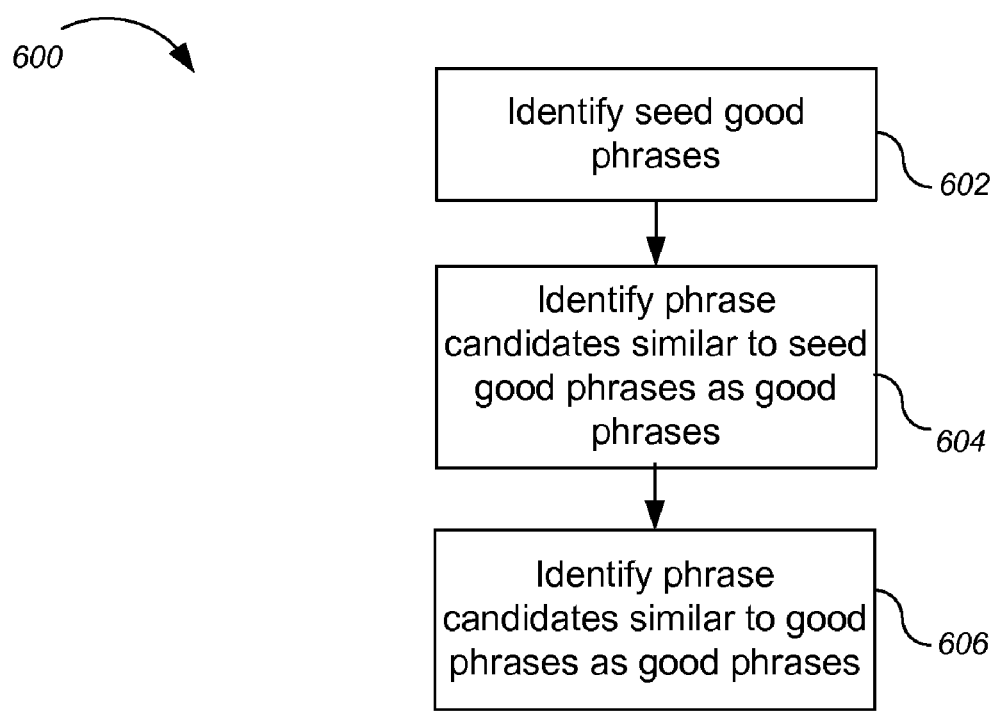
FIG. 6 is a flowchart of an example method for identifying good phrases.

FIG. 6 is a flowchart of an example method 600 for identifying good phrases. For convenience, the method 600 will be described with respect to a system that performs the method 600. The system identifies 602 seed good phrases. The seed good phrases can be manually generated. For example, one or more individuals can identify a few hundred phrases as good phrases. In some other implementations, dictionaries or other lexicographical sources can be used as a source for good phrases.

The system identifies 604 phrase candidates similar to seed good phrases as good phrases. In some implementations, the similarity data is used to identify similar phrases to the seed good phrases. For example, if New York is a seed good phrase, because it is similar to San Francisco and Chicago as similar phrase candidates, then San Francisco and Chicago are added as good phrases. In some implementations, good phrases are added only if the similarity exceeds a particular threshold level (e.g., a threshold cosine difference between the phrase candidates).

The system further identifies 606 additional good phrases as phrase candidates that are similar to other identified good phrases. The number of good phrases can expand based on phrase candidates that are similar to each newly identified good phrase. For example, the good phrases San Francisco and Chicago, added because of similarity to a seed good phrase, can be similar to the phrase candidates. Those similar phrase candidates can also be added as good phrases. Consequently, a small collection of seed good phrases can be used to repetitively identify a large collection of good phrases based on similarity. The collection of identified good phrases can then be used for one or more natural language processing applications. The collection of good phrases can be stored or transmitted for later use in addition to being made available for multiple applications.

Similarly, in some implementations, a collection of seed bad phrases (e.g., non-phrases) can be used to identify similar bad phrases. The above process can be used to identify a large collection of bad phrases. And in some implementations, this process could be done in conjunction with the identification of good phrases, such that the two processes check and balance each other. The resulting bad phrase collection can then be used to identify and remove bad phrases from a larger collection of candidate phrases.

Figure 7:
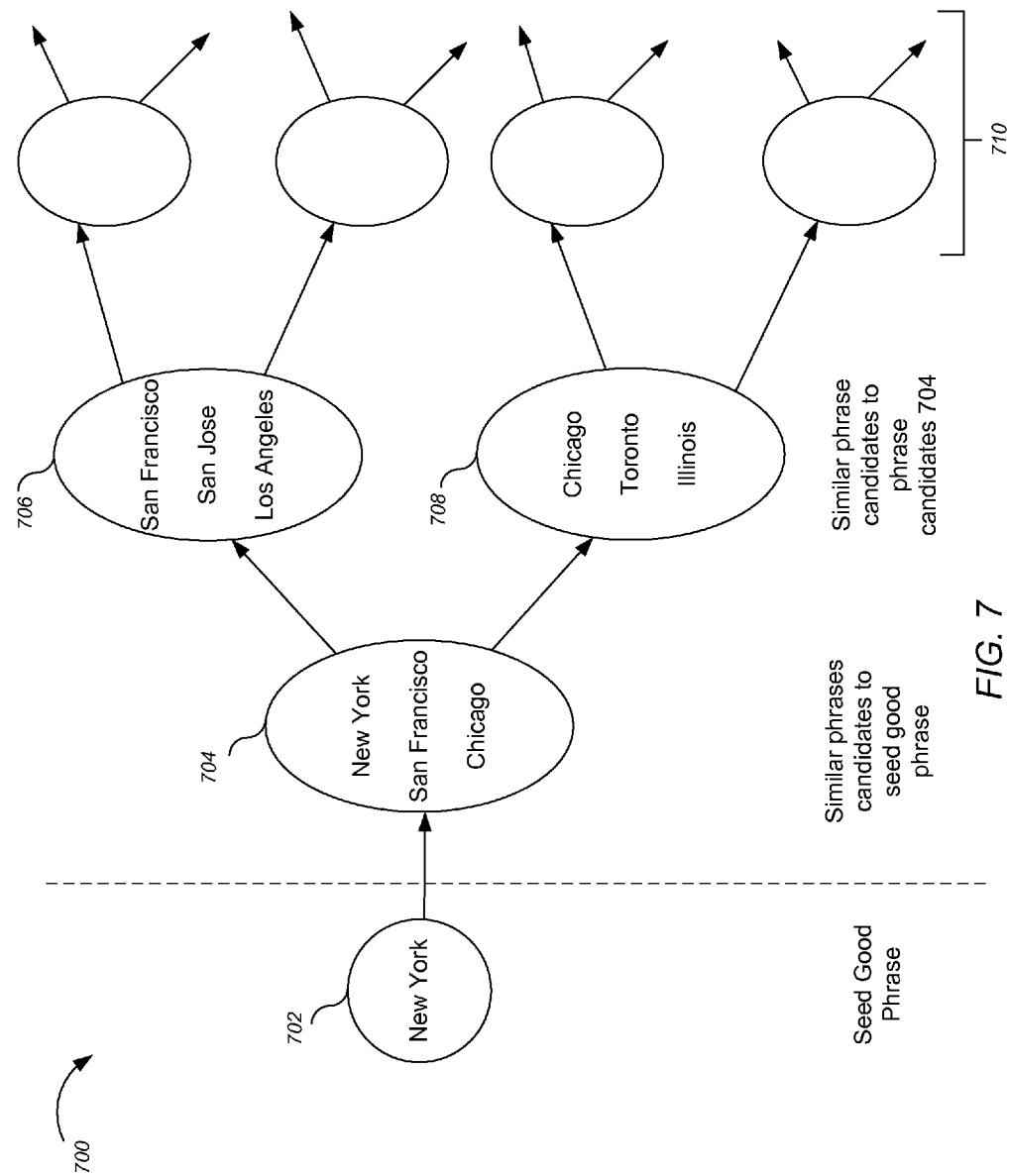
FIG. 7 is an example schematic mapping of good phrases identified from a seed good phrase.

FIG. 7 is an example mapping 700 of good phrases identified from a seed good phrase 702. The seed good phrase 702 "New York" is similar to other phrase candidates, for example, phrase candidates 704 including San Francisco and Chicago. Because these are similar to the seed good phrase, the phrase candidates 704 become good phrases. Good phrases San Francisco and Chicago are also similar to other phrase candidates, for example, phrase candidates 706 and 708, respectively, which are then also identified as good phrases.

The good phrases from phrase candidates 706 and 708 lead to additional phrase candidates 710 expanding the collection of good phrases.

Figure 8:
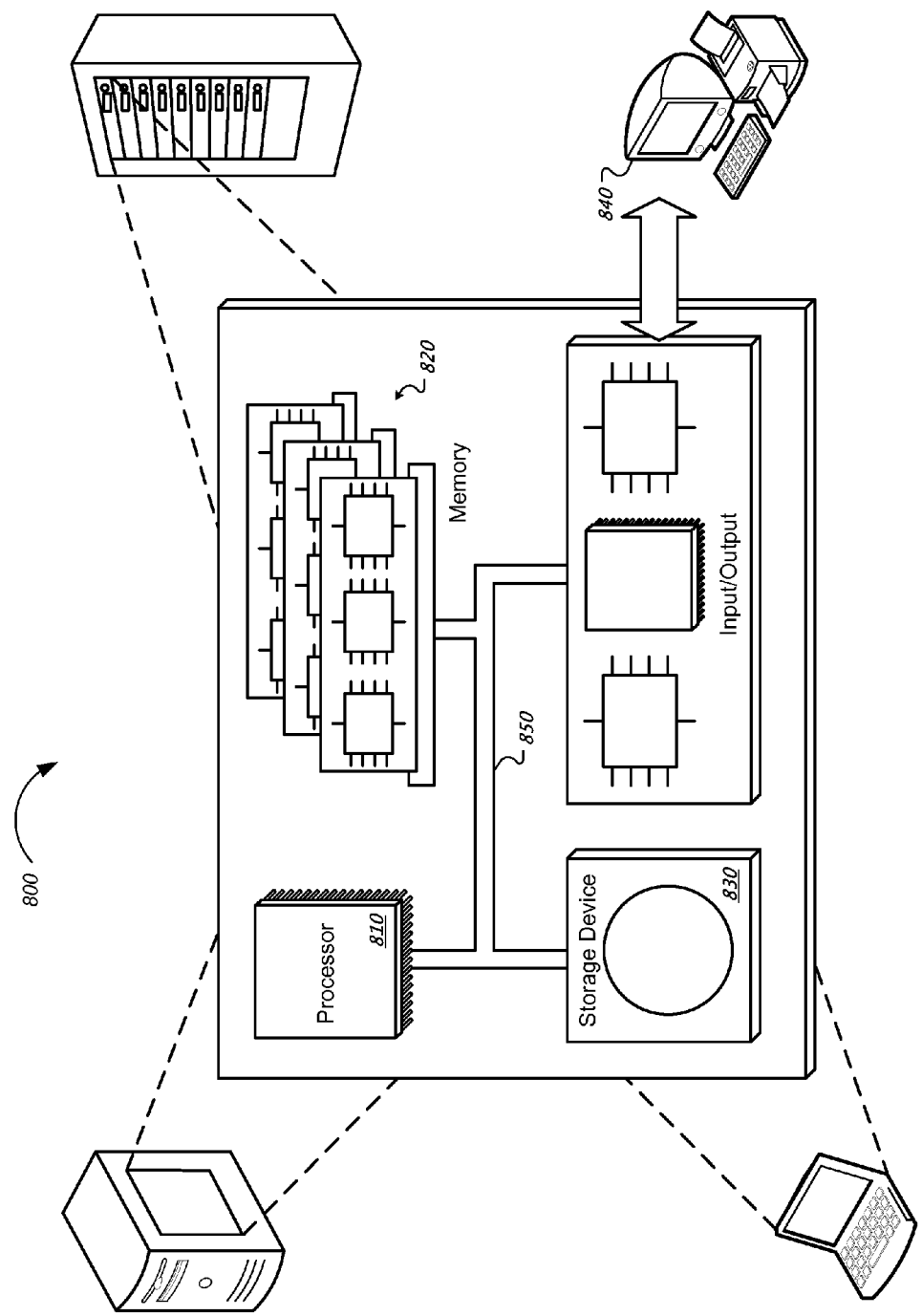
FIG. 8 is a block diagram of an example computer system.

FIG. 8 is a block diagram of an example computer system. The system 800 can be used for practicing operations described for example, in association with methods 200, 300, 400, and 600. The system 800 can include a processor 810, a memory 820, a storage device 830, and input/output devices 840. Each of the components 810, 820, 830, and 840 are interconnected using a system bus 850. The processor 810 is capable of processing instructions for execution within the system 800. Such executed instructions can implement one or more components of system 800, for example. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 is a computer readable medium such as volatile or non volatile that stores information within the system 800. The memory 820 could store data structures representing history trees and reduced history trees for complex solids, for example. The storage device 830 is capable of providing persistent storage for the system 800. The storage device 830 may be a floppy disk device, a hard disk device, an optical disk device, or a tape device, or other suitable persistent storage means. The input/output device 840 provides input/output operations for the system 800. In one implementation, the input/output device 840 includes a keyboard and/or pointing device. In another implementation, the input/output device 840 includes a display unit for displaying graphical user interfaces.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    identifying a plurality of phrase candidates from a plurality of text string entries in a corpus;
    for each phrase candidate of the plurality of phrase candidates:
        identifying a plurality of left contexts and a plurality of right contexts for the phrase candidate, each left context of the plurality of left contexts being a nearest unique feature to the left of the phrase candidate in each respective text string entry and each right context of the plurality of right contexts being a nearest unique feature to the right of the phrase candidate in each respective text string entry, and
        calculating both a left context vector including a respective score for each left context feature and a right context vector including a respective score for each right context feature of the phrase candidate; and determining a similarity between one or more pairs of phrase candidates of the plurality of phrase candidates using the respective left and right context vectors for each phrase candidate of each pair, wherein determining a similarity between a pair of phrase candidates includes:

calculating a first similarity between the respective left context vectors of the pair of phrase candidates;

calculating a second similarity between the respective right context vectors of the pair of phrase candidates; and calculating the similarity between the pair of phrase candidates using the first similarity and the second similarity.

2. The method of claim 1, where the features are particular n-grams identified from a frequency count of n-grams occurring in a feature corpus.

3. The method of claim 1, further comprising clustering similar phrase candidates.

4. The method of claim 3, further comprising:
identifying common features from each phrase candidate in the respective cluster;
filtering one or more features of the phrase candidates including removing non-common features; and
determining a refined similarity between one or more pairs of phrase candidates using the filtered features for each phrase candidate.

5. The method of claim 1, where the phrase candidates are derived from filtered search queries or web documents.

6. The method of claim 5, where the search queries have been filtered to remove non-phrases.

7. The method of claim 1, where the score for each feature is a mutual information score representing a relationship strength between the feature and a particular phrase candidate.

8. The method of claim 1, further comprising: identifying good phrases including:
identifying seed good phrases; and
determining phrase candidates similar to seed good phrases as good phrases.

9. The method of claim 8, where the seed good phrases are identified from a randomly selected collection of seed good phrases.

10. The method of claim 1, where determining the similarity between a particular pair of phrase candidates includes calculating a vector distance between left and right context vectors of each phrase candidate of the pair and determining the similarity based on the calculated distances.

11. A computer program product, encoded on a non-transitory computer-readable medium, operable to cause data processing apparatus to perform operations comprising:
identifying a plurality of phrase candidates from a plurality of text string entries in a corpus;
for each phrase candidate of the plurality of phrase candidates:
identifying a plurality of left contexts and a plurality of right contexts for the phrase candidate, each left context of the plurality of left contexts being a nearest unique feature to the left of the phrase candidate in each respective text string entry and each right context of the plurality of right contexts being a nearest unique feature to the right of the phrase candidate in each respective text string entry, and
calculating both a left context vector including a respective score for each left context feature and a right context vector including a respective score for each right context feature of the phrase candidate; and determining a similarity between one or more pairs of phrase candidates of the plurality of phrase candidates using the respective left and right context vectors for each phrase candidate of each pair, wherein determining a similarity between a pair of phrase candidates includes:

calculating a first similarity between the respective left context vectors of the pair of phrase candidates;

calculating a second similarity between the respective right context vectors of the pair of phrase candidates; and calculating the similarity between the pair of phrase candidates using the first similarity and the second similarity.

12. A system comprising:
one or more computers operable to perform operations including:
identifying a plurality of phrase candidates from a plurality of text string entries in a corpus;
for each phrase candidate of the plurality of phrase candidates:
identifying a plurality of left contexts and a plurality of right contexts for the phrase candidate, each left context of the plurality of left contexts being a nearest unique feature to the left of the phrase candidate in each respective text string entry and each right context of the plurality of right contexts being a nearest unique feature to the right of the phrase candidate in each respective text string entry, and
calculating both a left context vector including a respective score for each left context feature and a right context vector including a respective score for each right context feature of the phrase candidate; and determining a similarity between one or more pairs of phrase candidates of the plurality of phrase candidates using the respective left and right context vectors for each phrase candidate of each pair, wherein determining a similarity between a pair of phrase candidates includes:

calculating a first similarity between the respective left context vectors of the pair of phrase candidates;

calculating a second similarity between the respective right context vectors of the pair of phrase candidates; and calculating the similarity between the pair of phrase candidates using the first similarity and the second similarity.

13. The system of claim 12, where the features are particular n-grams identified from a frequency count of n-grams occurring in a feature corpus.

14. The system of claim 12, the operations further comprising clustering similar phrase candidates.

15. The system of claim 14, the operations further comprising:
identifying common features from each phrase candidate in the respective cluster;
filtering one or more features of the phrase candidates including removing non-common features; and
determining a refined similarity between one or more pairs of phrase candidates using the filtered features for each phrase candidate.

16. The system of claim 12, where the phrase candidates are derived from filtered search queries or web documents.

17. The system of claim 16, where the search queries have been filtered to remove non-phrases.

18. The system of claim 12, where the score for each feature is a mutual information score representing a relationship strength between the feature and a particular phrase candidate.

19. The system of claim 12, further comprising: identifying good phrases including:
   identifying seed good phrases; and
   determining phrase candidates similar to seed good phrases as good phrases.

20. The system of claim 19, where the seed good phrases are identified from a randomly selected collection of seed good phrases.

21. The system of claim 12, where the similarity between a particular pair of phrase candidates includes calculating a vector distance between left and right context vectors of each phrase candidate of the pair and determining the similarity based on the calculated distances.

22. A system comprising:
   means for identifying a plurality of phrase candidates from a plurality of text string entries in a corpus;
   for each phrase candidate of the plurality of phrase candidates:
      means for identifying a plurality of left contexts and a plurality of right contexts for the phrase candidate, each left context of the plurality of left contexts being a nearest unique feature to the left of the phrase candidate in each respective text string entry and each right context of the plurality of right contexts being a nearest unique feature to the right of the phrase candidate in each respective text string entry, and
      means for calculating a left context vector including a respective score for each left context feature and a right context vector including a respective score for each right context feature of the phrase candidate; and
   means for determining a similarity between one or more pairs of phrase candidates of the plurality of phrase candidates using the respective left and right context vectors for each phrase candidate of each pair, wherein determining a similarity between a pair of phrase candidates includes:
      calculating a first similarity between the respective left context vectors of the pair of phrase candidates;
      calculating a second similarity between the respective right context vectors of the pair of phrase candidates; and
      calculating the similarity between the pair of phrase candidates using the first similarity and the second similarity.

* * * * *